United States Patent
Lei et al.

(10) Patent No.: US 7,650,036 B2
(45) Date of Patent: Jan. 19, 2010

(54) SYSTEM AND METHOD FOR THREE-DIMENSIONAL VIDEO CODING

(75) Inventors: Shawmin Lei, Camas, WA (US); Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 979 days.

(21) Appl. No.: 10/817,309

(22) Filed: Apr. 2, 2004

(65) Prior Publication Data

US 2005/0084006 A1  Apr. 21, 2005

Related U.S. Application Data (60) Provisional application No. 60/512,155, filed on Oct. 16, 2003, provisional application No. 60/519,482, filed on Nov. 13, 2003.

(51) Int. Cl.
*G06K 9/36* (2006.01)
(52) U.S. Cl. .................. 382/232; 382/154; 348/446; 375/240.01; 345/10
(58) Field of Classification Search .................. 382/232
See application file for complete search history.

(56) References Cited

U.S. PATENT DOCUMENTS

| | | | |
|---|---|---|---|
| 5,012,326 A * | 4/1991 | Sakamoto et al. ........... 348/446 |
| 5,633,682 A | 5/1997 | Tahara |
| 5,767,898 A * | 6/1998 | Urano et al. .................. 348/43 |
| 6,081,270 A * | 6/2000 | Berry et al. .................. 345/419 |
| 6,449,003 B1 * | 9/2002 | Mayer et al. .................. 348/43 |
| 6,515,663 B1 * | 2/2003 | Hung et al. .................. 345/427 |
| 6,574,423 B1 * | 6/2003 | Oshima et al. ............. 386/111 |
| 6,765,568 B2 * | 7/2004 | Swift et al. .................. 345/419 |
| 6,784,891 B2 * | 8/2004 | Inuzuka et al. ............. 382/232 |
| 7,254,265 B2 * | 8/2007 | Naske et al. ................ 382/154 |

(Continued)

FOREIGN PATENT DOCUMENTS

EP        639031 A2 *  2/1995

(Continued)

OTHER PUBLICATIONS

Wiegand et al., "Overview of the H.264/AVC Video Coding Standard", Jul. 2003, IEEE, IEEE Transactions on Circuits an Systems for Video Technology, vol. 13, No. 7, pp. 560-576.*

(Continued)

*Primary Examiner*—Sath V Perungavoor
(74) *Attorney, Agent, or Firm*—Law Office of Gerald Maliszewski; Gerald Maliszewski (57) ABSTRACT

Systems and methods are provided for receiving and encoding 3D video. The receiving method comprises: accepting a bitstream with a current video frame encoded with two interlaced fields, in a MPEG2, MPEG4, or H.264 standard; decoding a current frame top field; decoding a current frame bottom field; and, presenting the decoded top and bottom fields as a 3D frame image. In some aspects, the method presents the decoded top and bottom fields as a stereo-view image. In other aspects, the method accepts 2D selection commands in response to a trigger such as receiving a supplemental enhancement information (SEI) message, an analysis of display capabilities, manual selection, or receiver system configuration. Then, only one of the current frame interlaced fields is decoded, and a 2D frame image is presented.

35 Claims, 4 Drawing Sheets

U.S. PATENT DOCUMENTS

| | | | |
|---|---|---|---|
| 2002/0009137 A1 | 1/2002 | Nelson et al. | 375/240.1 |
| 2002/0047835 A1* | 4/2002 | Kawai et al. | 345/204 |
| 2002/0122585 A1* | 9/2002 | Swift et al. | 382/154 |
| 2003/0095177 A1* | 5/2003 | Yun et al. | 348/42 |
| 2004/0022418 A1* | 2/2004 | Oota | 382/106 |
| 2004/0032980 A1* | 2/2004 | Harman | 382/154 |
| 2004/0096109 A1* | 5/2004 | Wang et al. | 382/236 |
| 2004/0126020 A1* | 7/2004 | Sakuyama et al. | 382/232 |
| 2004/0218816 A1* | 11/2004 | Hannuksela | 382/232 |
| 2006/0013490 A1* | 1/2006 | Sun | 382/232 |
| 2006/0177123 A1* | 8/2006 | Ha | 382/154 |

FOREIGN PATENT DOCUMENTS

| | | |
|---|---|---|
| WO | WO 03/056843 | 7/2003 |

OTHER PUBLICATIONS

Taylor, DVD Demystified, McGraw-Hill, 2001, pp. 138-142.

Engdahl, How to Show Video Material in Computer Screen, Nov. 5, 1999, web.archieve.orgiweb/19991105154813.

Hur et al., Experimental Service of 3DTV Broadcasting Replay in Korea, Proceedings of the SPIE, vol. 4864, 2002, pp. 1-13.

Eichenlaub, A Lightweight Compact 2-D/3-D Autostereescopic LCD Backlight for Games, Monitor, and Notebook Applications, SID International Symposium Digest of Technical Papers.

Wiegand et al., Overview of the H.264/AVC Video COding Standard, IEEE Transactions on Circuits and Systems for Video Technology, vol. 13, No. 7, Jul. 2003, pp. 560-576.

* cited by examiner

SYSTEM AND METHOD FOR THREE-DIMENSIONAL VIDEO CODING

RELATED APPLICATIONS

This application claims the benefit of a provisional application entitled, SYSTEMS AND METHODS FOR STEREO VIDEO CODING, invented by Lei et al., Ser. No. 60,512,155, filed Oct. 16, 2003.

This application claims the benefit of a provisional application entitled, SYSTEMS AND METHODS FOR STEREO VIDEO CODING, invented by Lei et al., Ser. No. 60,519,482, filed Nov. 13, 2003.

BACKGROUND OF THE INVENTION

1. Field of the Invention

This invention generally relates to video compression and, more particularly, to a system and method of encoding/decoding compressed video for three-dimensional and stereo viewing.

2. Description of the Related Art

Conventional video compression techniques typically handle three-dimensional (3D), or stereo-view video, in units of a frame. The most straightforward method is to code two views separately, as independent video sequences. This straightforward method, however, suffers from poor coding efficiency. It also has higher complexity because it needs to encode/decoder, multiplex/demultiplex, and synchronize two bitstreams. To reduce the complexity of bitstream handling, synchronized frames from each view can also be grouped together to form a composite frame, and then coded into one single bitstream. This composite-frame method still suffers from poor coding efficiency. It also loses a view-scalable functionality, i.e., decoder can choose to decode and display only one view.

Alternately, as noted in U.S. patent application 20020009137, one view can be coded into a base layer bitstream, and the other view into an enhancement layer. This layer approach not only has a better coding efficiency, but it also preserves the view-scalable functionality. However, this method still has higher complexity due to its needs to handle multiple bitstreams (base-layer and enhanced-layer bitstreams).

It would be advantageous if compressed 3D video could be communicated with greater efficiency.

It would be advantageous if only one view of a compressed 3D or stereo-view could be decoded to permit viewing on legacy 2D displays.

SUMMARY OF THE INVENTION

The present invention treats 3D video frames as interlaced materials. Therefore, a 3D view can be coded using existing interlace-coding methods, such as those in H.264, which enable better compression. Further, the invention supports a scalable coding (two-dimensional view) feature with minimal restrictions on the encoder side. The scalable decoding option can be signaled in a simple SEI message, for example.

Accordingly, a method is provided for receiving 3D video. The method comprises: accepting a bitstream with a current video frame encoded with two interlaced fields, in a Motion Pictures Expert Group-2 (MPEG2), MPEG4, or ITU-T H.264 standard; decoding a current frame top field; decoding a current frame bottom field; and, presenting the decoded top and bottom fields as a 3D frame image. In some aspects, the method presents the decoded top and bottom fields as a stereo-view image.

In some aspects, the method accepts 2D selection commands in response to a trigger such as receiving a supplemental enhancement information (SEI) message. Other triggers include an analysis of display capabilities, manual selection, or receiver system configuration. Then, only one of the current frame interlaced fields is decoded, and a 2D frame image is presented.

In one aspect of the method, a first encoded video frame is accepted prior to accepting the current frame. Then, the method: derives a predictive first frame top field; and, derives a predictive first frame bottom field. Then, the current frame top and bottom fields are decoded in response to the predictive first frame top field and predictive first frame bottom field, respectively.

Likewise, a method is providing for encoding 3D video, comprising: accepting a current 3D video image, including a first view of the image and a second, 3D, view of the image; encoding the first view as a frame top field; encoding the second view as the frame bottom field; and, transmitting a bitstream with a current video frame, having the top field interlaced with the bottom field, into a channel.

Additional details of the above-described methods, and 3D video encoder and receiver systems are provided below.

DETAILED DESCRIPTION OF THE PREFERRED EMBODIMENTS

Figure 1:
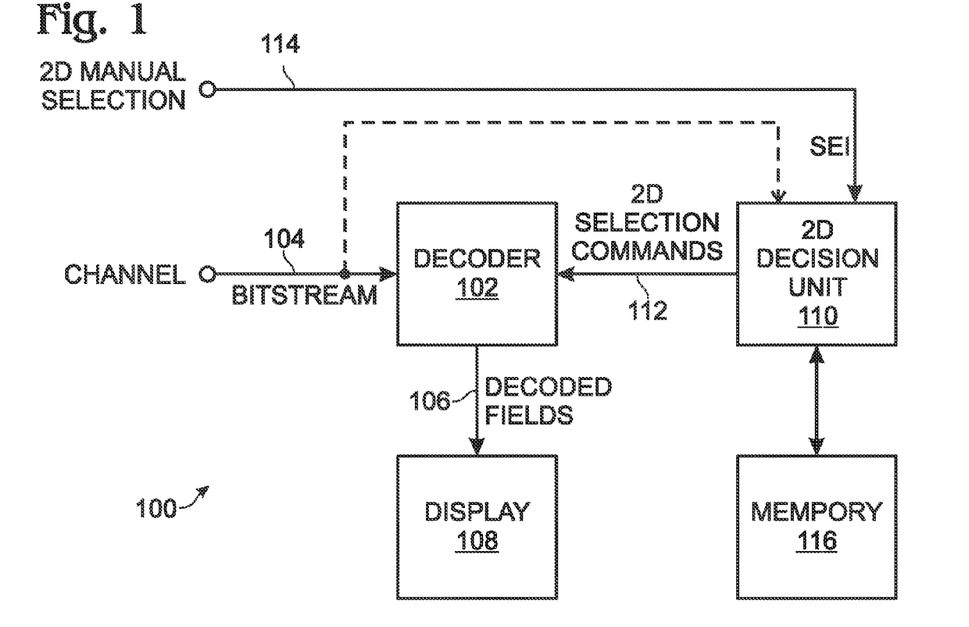
FIG. 1 is a schematic block diagram of the present invention 3D video receiver system.

FIG. 1 is a schematic block diagram of the present invention 3D video receiver system. The system 100 comprises a decoder 102 having an input connected to a channel on line 104 to accept a bitstream with a current video frame encoded with two interlaced fields. For example, line 104 may be connected to the Internet, a satellite receiver, or a digital cable network. The decoder 102 accepts the bitstream in a standard such as MPEG2, MPEG4, or ITU-T H.264. The decoder 102 has an output on line 106 to supply a decoded current frame top field and current frame bottom field. A display 108 has an input to accept the decoded fields on line 106. The display 108 visually presents the decoded top and bottom fields as a 3D frame image. For example, the display 108 can be a high-definition TV. In other aspects of the system, the display 108 visually presents the decoded top and bottom fields as a stereo-view image.

Generally, the display 108 may visually presents a two-dimensional (2D) image in response to using only one of the decoded current frame interlaced fields. Also, as a selected alternative to the presentation of the 3D image, the display 108 may present a 2D image in response to using only one of the decoded current frame interlaced fields. For example, a user may manually select to view a 2D image, even if a 3D image is available.

In other aspects, the decoder 102 may analyze the display capabilities and decode only one of the current frame interlaced fields, if non-3D display capabilities are detected. For example, the decoder may detect that display 108 is a legacy television. In this circumstance, the display 108 visually presents a two-dimensional (2D) image.

In some aspects, the decoder 102 receives a supplemental enhancement information (SEI) 3D content message with the current video frame. There are many types of conventional SEI messages. The 3D content SEI message is a message acts as a signal that the referenced frame(s) include 3D content organized as top and bottom fields in a frame. The 3D content SEI messages may trigger the decoder 102 to analyze display capabilities. This analysis may be a result of a query directed to display 108, or a result of accessing pre-configured information in memory concerning display capabilities. If non-3D display capabilities are detected, the decoder may elect to decode only one of the current frame interlaced fields in response to the 3D option SEI message. Since only one field is supplied by the decoder 102, the display 108 visually presents a two-dimensional (2D) image. Note, the decoder 102 may still provide both fields of a 3D view to a display 108, even if the display is not enabled to present a 3D image.

In some aspects, the decoder 102 includes a 2D decision unit 110 to supply 2D selection commands on line 112. The decoder 102 decodes only one of the current frame interlaced fields in response to the 2D selection commands. In response, the display 108 visually presents a 2D image. The decoder 2D decision unit 110 supplies 2D selection commands in response to a trigger such as receiving an SEI message on line 104. The trigger may be an analysis of display capabilities. For example, capabilities may be explored in communications with the display on line 106. In other aspects, the trigger may be responsive to a manual selection made by the user and received on line 114. In another aspect, the trigger can be responsive to the receiver system configuration stored in memory 116.

The organization of top and bottom fields as complementary 3D views is compatible with predictive encoding and decoding processes. With respect to MPEG standards, intra-coded frames (I-frames) are used to carry information that can be used as a foundation in a series of subsequent frames. With respect to H.264, the predictive frame is called an independent decoder refresh (IDR) picture. In some aspects, the decoder accepts a first encoded video frame prior to accepting the current frame. The decoder 102 derives a predictive first frame top field and a predictive first frame bottom field from the first frame. Then, the decoder 102 decodes the current frame top field in response to the predictive first frame top field. Likewise, the current frame bottom field is decoded in response to the predictive first frame bottom field.

Alternately, the decoder 102 derives a predictive first frame first field from the first frame. The first field may be either a top field or a bottom field. The decoder 102 decodes the current frame top field in response to the predictive first frame first field, and decodes the current frame bottom field in response to the predictive first frame first field.

Figure 2:
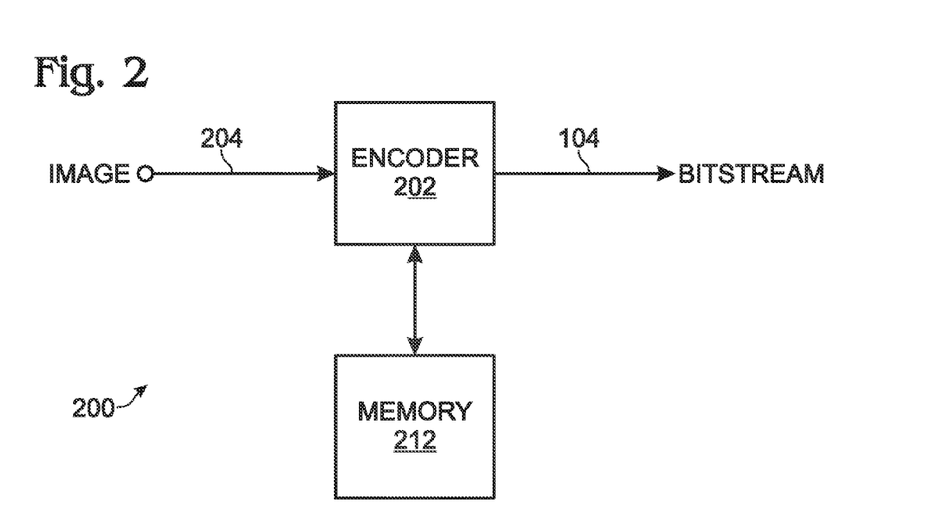
FIG. 2 is a schematic block diagram of the present invention 3D video encoding system.

FIG. 2 is a schematic block diagram of the present invention 3D video encoding system. The system 200 comprises an encoder 202 having an input on line 204 to accept a current 3D video image, including a first view of the image and a second, 3D, view of the image. In some aspects, the encoder 202 accepts a stereo image. The encoder 202 encodes the first view as a frame top field and encodes the second view as the frame bottom field. The encoder 202 has a channel-connected output on line 104 to supply a bitstream with a current video frame, having the top field interlaced with the bottom field. The encoder 202 transmits the bitstream in a standard such as MPEG2, MPEG4, or H.264.

In one aspect of the system, the encoder 202 transmits a 2D command responsive to a trigger such as an analysis of connected receiver capabilities or the channel bandwidth. The analysis of receiver capabilities may occur as a result of accessing a memory 212 holding a record of receiver capabilities. For example, record may show that a connected receiver, or group of receivers, lacks 3D display capability. The analysis of channel bandwidth may be made as a result of accessing the memory 212, or a result of receiving a real-time measurement of bandwidth. In some circumstances the bandwidth may be small enough that the transmission of both fields is impractical. For these, and potentially other reasons, the encoder 202 may elect to encode and transmit only one of the fields from the current view frame.

In another aspect, the encoder 202 may transmit an SEI 3D optional message, to signal 3D views available, to describe how 3D views are mapped into interlaced fields, and to describe dependency of each field.

In another aspect, the encoder 202 may transmit an SEI 3D option message with the current video frame, to trigger optional single field two-dimensional (2D) decoding. For example, if 2D receiver capabilities are discovered, the encoder 202 may transmit the SEI 3D option message, along with only one of fields.

Prior to accepting the current video image, the encoder 202 may accept a first video image, and encode a first image top field, as well as a first image bottom field. For example, the first image top and bottom fields may be used to form either an I-frame (MPEG) or an IDR picture (H.264). Then, the encoder 204 encodes the current frame top field in response to the first image top field, and encodes the current frame bottom field in response to the first frame bottom field.

Alternately, a single field can be used to generate subsequent top and bottom fields. That is, the encoder 204, prior to accepting the current image, may accept a first video image and encode a first image first field. The first image first field may be either a top or bottom field. Then, the encoder 204 encodes the current frame top field in response to the first image first field, and encodes the current frame bottom field in response to the first image first field.

Functional Description

Figure 3:
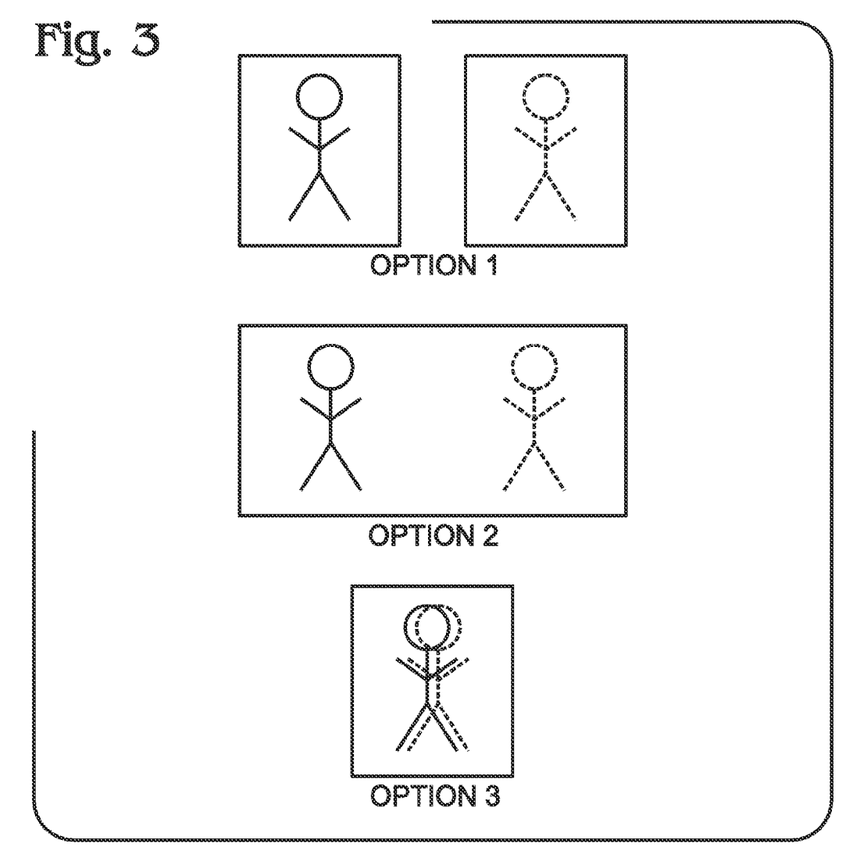
FIG. 3 illustrates the present invention 3D view field interlacing process.

FIG. 3 illustrates the present invention 3D view field interlacing process. Option 1 shows the left and right (stereo or 3D) views. Option 2 shows the views as a composite video frame.

Instead of treating stereo-view video frames as separate frames or a composite video frame, the present invention considers the sequence as interlaced materials. For example, as illustrated in option 3, the left view picture is the top field and the right view is the bottom field. It is straightforward to code the interlaced video frames using existing interlaced coding methods in different video coding standards, for example, but not limited to, MPEG2, MPEG4, and H.264. The use of these standards enables better compression and bitstream handling.

Using the interlaced coding methods of the above-mentioned video coding standards, a scalable decoding option can be supported with minimal restrictions on the encoder side. The scalable option means that at least one view (or field) can be decoded independently, without referring to bitstream of the other view (or field). This option permits decoder and encoder devices to be used with legacy devices that do not support 3D display functionality. To enable this scalable coding option, all pictures are coded in field-picture mode. At least one field (either top or bottom) is self-contained; and for a self-contained field, the corresponding field pictures can only use previously coded field pictures with the same parity as reference for motion compensation.

Here is a very brief summary of relevant H.264 coding tools. H.264 is the latest international video coding standard. Relative to prior video coding methods, some new interframe prediction options have been designed to enhance the prediction flexibility and accuracy. H.264 permits multiple reference pictures to be used for inter prediction. That is, more than one prior coded picture can be used as references for inter prediction. To allow for better handling of interlaced materials, H.264 permits a video frame to be coded as either a frame picture, or two field pictures. The choice between these two options is referred to as picture-level adaptive-frame-field (PAFF) coding. This idea can be extended to the macroblock level, to enable the option of Macroblock-level adaptive frame-field (MBAFF) coding.

Figure 4:
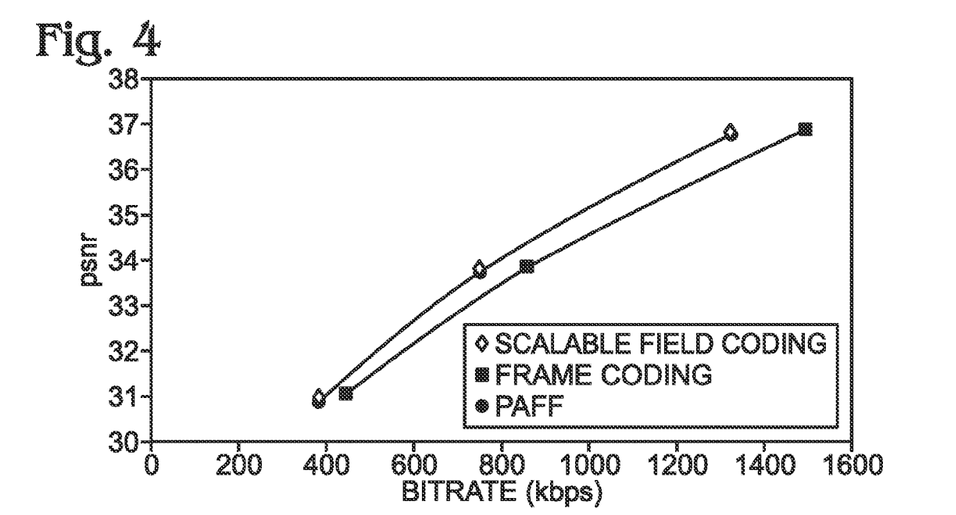
FIG. 4 is a graph illustrating a comparison of coding performance.

FIG. 4 is a graph illustrating a comparison of coding performance. Experiments were conducted to evaluate the coding performance using the H.264 verification model JM7.3 software. The encoding parameters are: 5 reference frames, +/− 32 pixel motion search range, 15-frame group of pictures (GOP) with IPPP (an Intra-frame followed by 14 P pictures), RD-optimization (a JM software encoding option), CAVLC (context adaptive variable length coding—an entropy option in the H.264 standard), and a fixed quantization parameter (QP) of 28/32/36. A 300-frame stereo sequence was coded in the following three settings:

1. Full frame coding (as option 2 in FIG. 3);
2. PAFF coding (as option 3 in FIG. 3, with no restriction on reference pictures); and
3. Scalable field coding (as option 3 in FIG. 3, with restriction on reference pictures).

The coding performances are shown in FIG. 4. The scalable field coding (setting #3) and PAFF coding (setting #3) essentially overlap. Both setting #2 and setting #3 have much better coding performance than setting #1. The difference is roughly 0.8 dB at relatively high quality side. The higher the peak signal-to-noise ratio (PSNR) values, the better the coding performance. So, for example, setting #2 is better than setting #1 (by 0.8 dB at the high bitrate side). Compared to setting #2, setting #3 has very little overhead, less than 0.1 dB.

Figure 5:
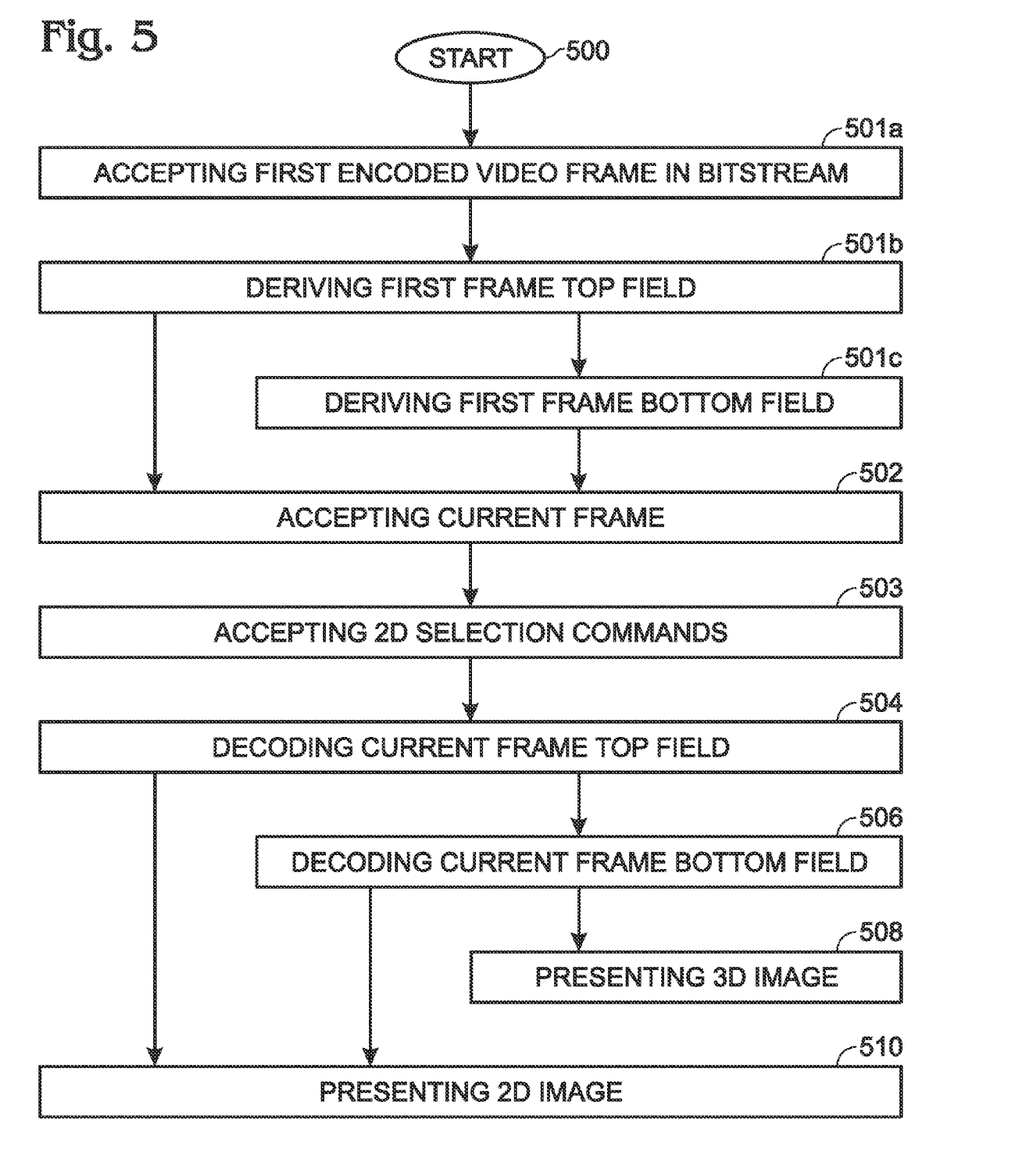
FIG. 5 is a flowchart illustrating the present invention method for receiving 3D video.

FIG. 5 is a flowchart illustrating the present invention method for receiving 3D video. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 accepts a bitstream with a current video frame encoded with two interlaced fields. For example, the bitstream is a standard such as MPEG2, MPEG4, or H.264. Step 504 decodes a current frame top field. Step 506 decodes a current frame bottom field. Step 508 presents the decoded top and bottom fields as a 3D frame image. In some aspects, Step 508 presents the decoded top and bottom fields as a stereo-view image. In one aspect of the method, Step 503 accepts a 2D selection command. For example, the 2D selection command may be accepted in response to a trigger such as a supplemental enhancement information (SEI) message, an analysis of display capabilities, manual selection, or receiver system configuration. Then, only one of the current frame interlaced fields is used in response to the 2D selection commands. That is, either Step 504 or Step 506 is preformed. As shown, Step 504 is performed (Step 506 is bypassed). Step 510 presents a 2D frame image. Alternately, both fields may be decoded but a 2D frame image is presented in Step 510 in response to using only one of the decoded current frame interlaced fields. In one aspect of the method, simultaneous with the presentation of the 3D image (Step 508), Step 510 presents a 2D image in response to using one of the decoded current frame interlaced fields. The simultaneous presentation of 2D and 3D images may represent that either the 2D or 3D view may be selected.

In another aspect of the method, Step 503 is organized into substeps, not shown. Step 503a receives a (SEI) 3D content message with the current video frame. Step 503b analyzes display capabilities. If non-3D display capabilities are detected, only one of the current frame interlaced fields is decoded. That is, either Step 504 or Step 506 is performed. Then, Step 510 presents a 2D frame image.

In another aspect, Step 503 accepts an SEI 3D optional message, to signal 3D views available, to describe how 3D views are mapped into interlaced fields, and to describe the dependency of each field. In another aspect, Step 501a accepts a first encoded video frame prior to accepting the current frame. Step 501b derives a predictive first frame top field. Step 501c derives a predictive first frame bottom field. Then, decoding the current frame top field (Step 504) includes decoding the current frame top field in response to the predictive first frame top field. Likewise, decoding a current frame bottom field (Step 506) includes decoding the current frame bottom field in response to the predictive first frame bottom field.

Alternately, but not shown, Step 501b derives a predictive first frame first field, either a top field or a bottom field. In this aspect Step 501c is bypassed. Then, Step 504 decodes the current frame top field in response to the predictive first frame first field. Step 506 decodes the current frame bottom field in response to the predictive first frame first field.

Figure 6:
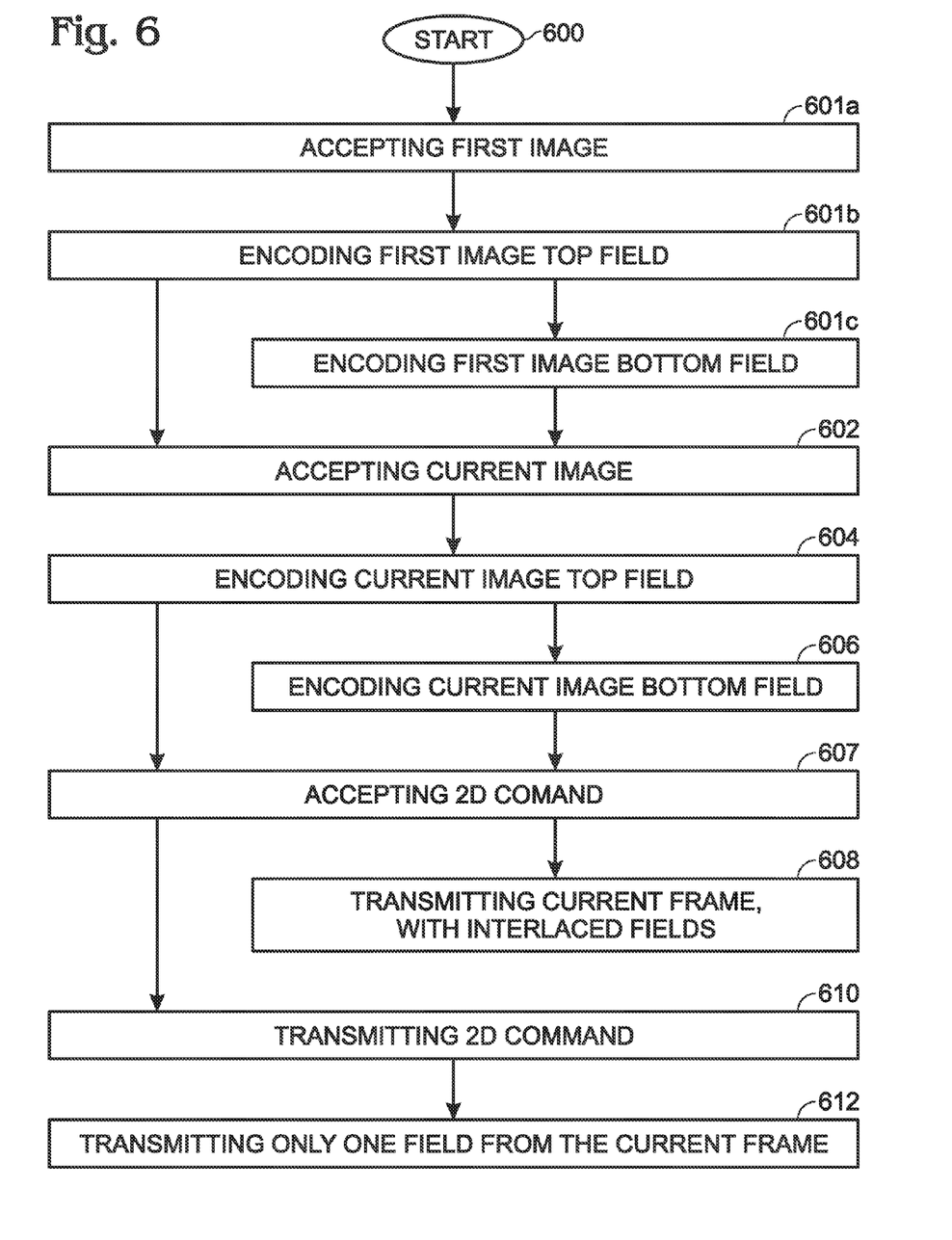
FIG. 6 is a flowchart illustrating the present invention method for encoding 3D video.

FIG. 6 is a flowchart illustrating the present invention method for encoding 3D video. The method starts at Step 600. Step 602 accepts a current 3D video image, including a first view of the image and a second, 3D, view of the image. In one aspect, Step 602 accepts a first and second view of a stereo image. Step 604 encodes the first view as a frame top field. Step 606 encodes the second view as the frame bottom field. Step 608 transmits a bitstream with a current video frame, having the top field interlaced with the bottom field, into a channel. For example, Step 608 transmits the bitstream in a standard such as MPEG2, MPEG4, or ITU-T H.264.

In one aspect, Step 607 accepts a 2D command responsive to a trigger such as an analysis of receiver capabilities or the channel bandwidth. Then, Step 610 transmits the 2D command to a receiver. In one aspect, Step 610 transmits a supplemental enhancement information (SEI) 3D option message with the current video frame to trigger optional single field two-dimensional (2D) decoding. In another aspect, Step 612 transmits only one of the fields from the current view frame, if the 2D command is transmitted in Step 610.

In one aspect, Step 601a accepts a first video image prior to accepting the current video image. Step 601b encodes a first image top field. Step 601c encodes a first image bottom field. For example, an I-frame may be encoded for MPEG standard transmissions. Then, Step 604 encodes the current frame top field in response to the first image top field, and Step 606 encodes the current frame bottom field in response to the first frame bottom field.

Alternately, Step 601b encodes a first image first field, either a top field or a bottom field, and Step 601c is bypassed. Then, Step 604 encodes the current frame top field in response to the first image first field, and Step 606 encodes the current frame bottom field in response to the first image first field.

Systems and methods for 3D encoding and decoding have been provided. Examples have been given as to how the processes may be scaled for 2D applications. Examples have also been given for how the processes may be enabled with predictive coding. However, the present invention is not limited to merely these examples. Other variations and embodiments of the invention will occur to those skilled in the art.

We claim:

1. A method for receiving three-dimensional (3D) video in a receiver system, the method comprising:
   in a receiver decoder:
      accepting an electromagnetic waveform representing a bitstream with two interlaced fields, both encoded in a single first video frame, with a supplemental enhancement information (SEI) 3D content message;
      analyzing display capabilities in response to being triggered by the SEI 3D content message;
      if 3D display abilities are detected, decoding a first frame top field from the first video frame and decoding a first frame bottom field from the first video frame;
      if non-3D display capabilities are detected, decoding only one of the first video frame interlaced fields; and,
   a display presenting an electromagnetic waveform representing the decoded top and bottom fields as a 3D frame image if 3D capable, and presenting a two-dimensional (2D) frame image if non-3D capable.

2. The method of claim 1 wherein accepting a bitstream with first video frame encoded with two interlaced fields includes accepting the bitstream in a standard selected from the group including Motion Pictures Expert Group-2 (MPEG2), MPEG4, and ITU-T H.264 standards.

3. The method of claim 1 wherein presenting the decoded top and bottom fields as a 3D frame image includes presenting the decoded top and bottom fields as a stereo-view image.

4. The method of claim 1 further comprising:
   prior to accepting the first video frame, accepting a first encoded video frame;
   deriving a predictive first frame top field;
   deriving a predictive first frame bottom field;
   wherein decoding the first video frame top field includes decoding the first video frame top field in response to the predictive first frame top field; and,
   wherein decoding the first video frame bottom field includes decoding the first video frame bottom field in response to the predictive first frame bottom field.

5. The method of claim 1 further comprising:
   prior to accepting the first video frame, accepting a first encoded video frame;
   deriving a predictive first frame first field;
   wherein decoding the first video frame top field includes decoding the first video frame top field in response to the predictive first frame first field; and,
   wherein decoding the first video frame bottom field includes decoding the first video frame bottom field in response to the predictive first frame first field.

6. The method of claim 5 wherein deriving a predictive first frame first field includes deriving a predictive first frame top field.

7. The method of claim 5 wherein deriving a predictive first frame first field includes deriving a predictive first frame bottom field.

8. The method of claim 1 further comprising:
   simultaneous with the presentation of the 3D image, presenting a 2D image in response to using one of the decoded first frame interlaced fields.

9. A method for encoding three-dimensional (3D) video in a transmitter system, the method comprising:
   in a transmitter encoder:
      accepting an electromagnetic waveform representing a 3D video image, including a first view of the image and a second view of the image;
      encoding the first view as a top field in a single first video frame;
      encoding the second view as a bottom field in the first video frame; and,
      transmitting an electromagnetic waveform into a channel representing a first video frame bitstream having the top field interlaced with the bottom field in the single first video frame, and a supplemental enhancement information (SEI) 3D option message with the first video frame to trigger decoding selected from a group consisting of single field two-dimensional (2D) decoding, and top and bottom field 3D decoding in a receiver decoder, depending on receiver capabilities.

10. The method of claim 9 wherein transmitting the first video frame bitstream having the top field interlaced with the bottom field includes transmitting the bitstream in a standard selected from the group including Motion Pictures Expert Group-2 (MPEG2), MPEG4, and ITU-T H.264 standards.

11. The method of claim 9 wherein accepting a current 3D video image, including a first view of the image and a second, 3D, view of the image includes accepting a first and second view of a stereo image.

12. The method of claim 9 further comprising:
   accepting a 2D command responsive to a trigger selected from the group including an analysis of receiver capabilities and the channel bandwidth; and,
   transmitting the 2D command to a receiver.

13. The method of claim 12 further comprising:
   transmitting only one of the fields from the first video view frame.

14. The method of claim 9 further comprising: tuviste
   prior to accepting the current video image, accepting a first video image;
   encoding a first image top field;
   encoding a first image bottom field;
   wherein encoding the current frame top field includes encoding the current frame top field in response to the first image top field; and,
   wherein encoding the current frame bottom field includes encoding the first video frame bottom field in response to the first frame bottom field.

15. The method of claim 9 further comprising:
   prior to accepting the current image, accepting a first video image;
   encoding a first image first field;
   wherein encoding the current frame top field includes encoding the current frame top field in response to the first image first field; and,
   wherein encoding the current frame bottom field includes encoding the current frame bottom field in response to the first image first field.

16. The method of claim 15 wherein encoding a first image first field includes encoding a first image top field.

17. The method of claim 15 wherein encoding a first image first field includes encoding a first image bottom field.

18. A three-dimensional (3D) video receiver system, the system comprising:
a decoder having an input connected to a channel to accept a bitstream with a single first video frame encoded with two interlaced fields and an output to supply a top field and a bottom field, both decoded from the first video frame; and,
a display having an input to accept the decoded fields, the display visually presenting the decoded top and bottom fields as a 3D frame image;
wherein the decoder receives a supplemental enhancement information (SEI) 3D content message with the first video frame, analyzes display capabilities, and, if non-3D display capabilities are detected, decodes only one of the first frame interlaced fields in response to the 3D option SEI message; and,
wherein the display visually presents a two-dimensional (2D) image.

19. The system of claim 18 wherein the decoder accepts the bitstream in a standard selected from the group including Motion Pictures Expert Group-2 (MPEG2), MPEG4, and ITU-T H.264 standards.

20. The system of claim 18 wherein the display visually presents the decoded top and bottom fields as a stereo-view image.

21. The system of claim 18 wherein the decoder, prior to accepting the current frame, accepts a first encoded video frame, derives a predictive first frame top field, derives a predictive first frame bottom field, decodes the current frame top field in response to the predictive first frame top field, and decodes the current frame bottom field in response to the predictive first frame bottom field.

22. The system of claim 18 wherein the decoder, prior to accepting the first video frame, accepts a first encoded video frame, derives a predictive first frame first field, decodes the first video frame top field in response to the predictive first frame first field, and decodes the first video frame bottom field in response to the predictive first frame first field.

23. The system of claim 22 wherein the decoder derives a predictive first frame top field.

24. The system of claim 22 wherein the decoder derives a predictive first frame bottom field.

25. The system of claim 18 wherein the display, as a selected alternative to the presentation of the 3D image, presents a 2D image in response to using only one of the decoded first video frame interlaced fields.

26. A three-dimensional (3D) video encoding system, the system comprising:
an encoder having an input to accept a current 3D video image, including a first view of the image and a second, 3D, view of the image, the encoder encoding the first view as a frame top field and the second view as the frame bottom field, interlaced in a single first video frame, and the encoder having a channel-connected output to supply a first video frame bitstream; and,
wherein the encoder transmits a supplemental enhancement information (SEI) 3D option message with the first video frame, to trigger decoding selected from a group consisting of single field two-dimensional (2D) decoding and top and bottom field 3D decoding in response to receiver capabilities.

27. The system of claim 26 wherein the encoder transmits the bitstream in a standard selected from the group including Motion Pictures Expert Group-2 (MPEG2), MPEG4, and ITU-T H.264 standards.

28. The system of claim 26 wherein the encoder accepts a first and second view of a stereo image.

29. The system of claim 26 wherein the encoder transmits a 2D command responsive to a trigger selected from the group including an analysis of connected receiver capabilities and the channel bandwidth.

30. The system of claim 29 wherein the encoder encodes and transmits only one of the fields from the first video frame.

31. The system of claim 26 wherein the encoder, prior to accepting the current video image, accepts a first video image, encodes a first image top field, encodes a first image bottom field, encodes the current frame top field in response to the first image top field, and encodes the first video frame bottom field in response to the first image bottom field.

32. The system of claim 26 wherein the encoder, prior to accepting the current image, accepts a first video image, encodes a first image first field, encodes the first video frame top field in response to the first image first field, and encodes the first video frame bottom field in response to the first image first field.

33. The system of claim 32 wherein the first image first field is a first image top field.

34. The system of claim 32 wherein the first image first field is a first image bottom field.

35. A three-dimensional (3D) video decoder, the decoder comprising:
an input connected to a channel to accept a single first video frame bitstream encoded with two interlaced fields and a supplemental enhancement information (SEI) 3D content message with the first video frame;
a two-dimensional (2D) decision unit to analyze the SEI 3D content message, and if non-3D display capabilities are detected in an associated display, decoding only one of the first frame interlaced fields in response to the 3D option SEI message;
a 3D decision unit to analyze the SEI 3D content message, and if 3D display capabilities are detected in the associated display, decoding first frame interlaced top and bottom fields in response to the 3D option SEI message; and,
an output to supply at least one of the first video frame top field and the first video frame bottom field.

* * * * *

UNITED STATES PATENT AND TRADEMARK OFFICE
CERTIFICATE OF CORRECTION

PATENT NO. : 7,650,036 B2
APPLICATION NO. : 10/817309
DATED : January 19, 2010
INVENTOR(S) : Shawmin Lei et al.

It is certified that error appears in the above-identified patent and that said Letters Patent is hereby corrected as shown below:

Delete column 8, lines 44-55, and insert

Claim 14 should read as follows:

--14. The method of claim 9 further comprising:
prior to accepting the current video image, accepting a first video image;
encoding a first image top field;
encoding a first image bottom field;
wherein encoding the first video frame top field includes encoding the first video frame top field in response to the first image top field; and,
wherein encoding the first video frame bottom field includes encoding the first video frame bottom field in response to the first frame bottom field.--

Delete column 8, lines 56-65 and insert

Claim 15 should read as follows:

--15. The method of claim 9 further comprising:
prior to accepting the current image, accepting a first video image;
encoding a first image first field;
wherein encoding the first video frame top field includes encoding the first video frame top field in response to the first image first field; and,
wherein encoding the first video frame bottom field includes encoding the first video frame bottom field in response to the first image first field.--

Delete column 9, lines 28-34 and insert

Claim 21 should read as follows:

--21. The system of claim 18 wherein the decoder, prior to accepting the first video frame, accepts a first encoded video frame, derives a predictive first frame top field, derives a predictive first frame bottom field, decodes the first video frame top field in response to the predictive first frame top field, and decodes the first video frame bottom field in response to the predictive first frame bottom field.--

CERTIFICATE OF CORRECTION (continued)
U.S. Pat. No. 7,650,036 B2

Delete column 10, lines 21-32 and insert

Claim 31 should read as follows:

--31. The system of claim 26 wherein the encoder, prior to accepting the current video image, accepts a first video image, encodes a first image top field, encodes a first image bottom field, encodes the first video frame top field in response to the first image top field, and encodes the first video frame bottom field in response to the first image bottom field.--

Signed and Sealed this

Sixteenth Day of March, 2010

David J. Kappos
*Director of the United States Patent and Trademark Office*